United States Patent [19]
Hurrell, II et al.

[11] Patent Number: 5,218,862
[45] Date of Patent: Jun. 15, 1993

[54] TIRE PRESSURE MONITOR

[75] Inventors: George L. Hurrell, II; Donald L. Williams, both of Port Clinton; William M. Sandy, Jr., Seven Hills, all of Ohio

[73] Assignee: General Motors Corporation, Detroit, Mich.

[21] Appl. No.: 823,095

[22] Filed: Jan. 21, 1992

[51] Int. Cl.$^5$ .............................. B60C 23/00
[52] U.S. Cl. ............................ 73/146.5; 340/444; 364/558; 364/565
[58] Field of Search ............... 73/146.5; 340/444, 442; 364/558, 565

[56] References Cited
U.S. PATENT DOCUMENTS

| | | |
|---|---|---|
| 3,581,277 | 5/1971 | Beatty, Jr. et al. ............... 340/58 |
| 3,613,075 | 10/1971 | Griffiths et al. ............... 340/58 |
| 4,777,611 | 10/1988 | Tashiro et al. ............... 364/565 |
| 4,876,528 | 10/1989 | Walker et al. ............... 340/444 |

FOREIGN PATENT DOCUMENTS 2246461 1/1992 United Kingdom ............... 340/444

Primary Examiner—Donald O. Woodiel
Attorney, Agent, or Firm—Howard N. Conkey

[57] ABSTRACT

The relative speed of the tires of a vehicle is monitored as an indication of the operating state of the vehicle, wherein if the vehicle is not operating in one of a number of predetermined states, the relative speed is monitored as an indication of relative pressure of the vehicle tires, and further wherein differences in relative speed not related to the predetermined states, and not related to differences in relative pressure, are accounted for.

8 Claims, 6 Drawing Sheets

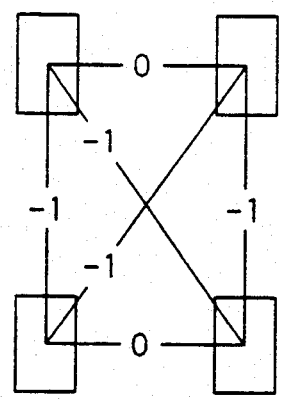
ACCELERATION
FIG. 4a
$$[PA] = \begin{bmatrix} PA_1 \\ PA_2 \\ \vdots \\ PA_6 \end{bmatrix} = \begin{bmatrix} 0 \\ 0 \\ -1 \\ -1 \\ -1 \\ -1 \end{bmatrix}$$
FIG. 4b
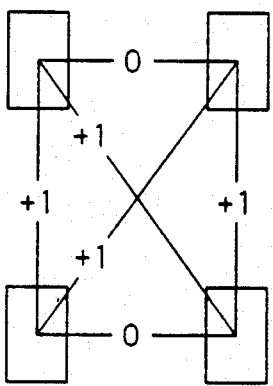
DECELERATION
FIG. 4c
$$[PD] = \begin{bmatrix} PD_1 \\ PD_2 \\ \vdots \\ PD_6 \end{bmatrix} = \begin{bmatrix} 0 \\ 0 \\ +1 \\ +1 \\ +1 \\ +1 \end{bmatrix}$$
FIG. 4d
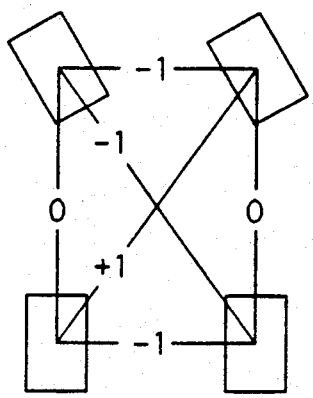
LEFT TURN
FIG. 4e
$$[PL] = \begin{bmatrix} PL_1 \\ PL_2 \\ \vdots \\ PL_6 \end{bmatrix} = \begin{bmatrix} -1 \\ -1 \\ 0 \\ 0 \\ -1 \\ +1 \end{bmatrix}$$
FIG. 4f

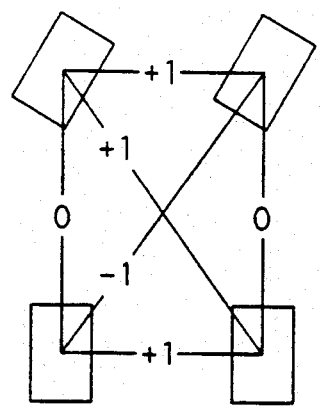

RIGHT TURN

FIG. 4g $$[PR] = \begin{bmatrix} PR_1 \\ PR_2 \\ \vdots \\ PR_6 \end{bmatrix} = \begin{bmatrix} +1 \\ +1 \\ 0 \\ 0 \\ +1 \\ -1 \end{bmatrix}$$

FIG. 4h

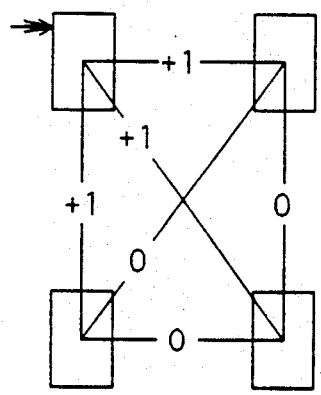

LEFT FRONT

FIG. 5a $$[PLLF] = \begin{bmatrix} PLLF_1 \\ PLLF_2 \\ \vdots \\ PLLF_6 \end{bmatrix} = \begin{bmatrix} +1 \\ 0 \\ +1 \\ 0 \\ +1 \\ 0 \end{bmatrix}$$

FIG. 5b

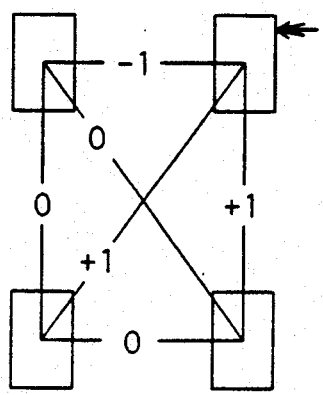

RIGHT FRONT

FIG. 5c $$[PLRF] = \begin{bmatrix} PLRF_1 \\ PLRF_2 \\ \vdots \\ PLRF_6 \end{bmatrix} = \begin{bmatrix} -1 \\ 0 \\ 0 \\ +1 \\ 0 \\ +1 \end{bmatrix}$$

FIG. 5d

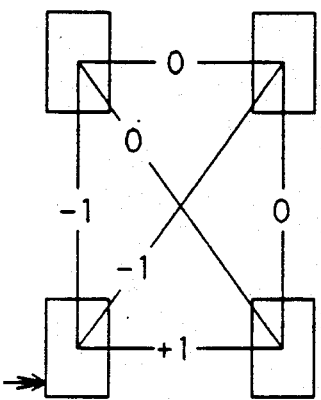
LEFT BACK
FIG. 5e
$$[PLLB] = \begin{bmatrix} PLLB_1 \\ PLLB_2 \\ \vdots \\ PLLB_6 \end{bmatrix} = \begin{bmatrix} 0 \\ +1 \\ -1 \\ 0 \\ 0 \\ -1 \end{bmatrix}$$
FIG. 5f
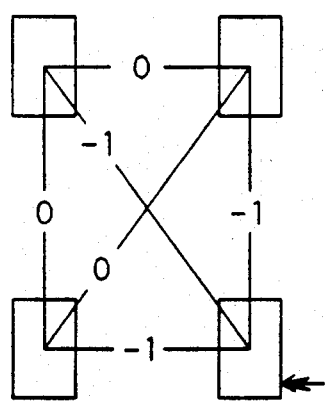
RIGHT BACK
FIG. 5g
$$[PLRB] = \begin{bmatrix} PLRB_1 \\ PLRB_2 \\ \vdots \\ PLRB_6 \end{bmatrix} = \begin{bmatrix} 0 \\ -1 \\ 0 \\ -1 \\ -1 \\ 0 \end{bmatrix}$$
FIG. 5h

TIRE PRESSURE MONITOR

FIELD OF THE INVENTION

The present invention relates to a method and apparatus for determining the inflation pressure of the tires of an automotive vehicle.

BACKGROUND OF THE INVENTION

Prior attempts have been made to determine the tire pressure of vehicle tires, for example using inflation pressure sensors on each of the vehicle tires as described in U.S. Pat. No. 3,938,076, or by attempting to measure the spring rate of the tire as described in U.S. Pat. No. 4,574,267. Any accurate tire pressure information that might be available with these systems is only achieved at substantial added cost and complexity.

Sophisticated automotive vehicle control systems are available that use wheel speed sensors on each of the wheels of the vehicle, for instance to provide information to anti-lock brake controllers or to traction controllers. Beyond the primary technologies that precipitated the use of individual wheel speed sensors on each of the vehicle wheels, there is at least one secondary use of individual wheel speed data, which is to provide an indication of each tire's rolling radius, which may be used to determine the pressure of the air in each of the tires.

Systems are available that attempt to determine tire pressure by monitoring wheel speed. Such systems generally make simple comparisons of the speed of the vehicle wheels relative to each other or relative to a predetermined reference value. These systems are susceptible to false alarms caused by a variety of external factors that bear on the speed of the individual wheels and are not detectable by such simple comparisons. Examples of such external factors are vehicle acceleration and deceleration, vehicle cornering, uneven vehicle loading for example from cargo, yaw moments caused by cross-winds, and traveling on uneven road surfaces such as hills.

Further, individual vehicles have peculiarities that cannot be accounted for in simple wheel speed monitoring systems, and can cause false alarms. For example, the type of tires and their wear pattern bears on the speed of the vehicle wheels, and may vary from tire to tire.

What is needed is a system capable of intelligently filtering out wheel speed variations caused by the above-described external factors so as to provide wheel speed information indicative of tire rolling radius and thus of tire pressure. The system must further be capable of learning the idiosyncrasies of the vehicles it is applied to, on a vehicle by vehicle basis, so as to provide more reliable information.

SUMMARY OF THE INVENTION

The present invention generally is a method and apparatus for determining the pressure of the vehicle tires via the sensed speed of the vehicle wheels. The present invention substantially reduces its susceptibility to false alarms by determining whether a variation in wheel speed is due to some external factor, or is due to a loss in pressure in one or more tires. Further, the present invention maintains a long-term running account of the wheel speed behavior in the absence of sensed external factors such as those described above, and factors that behavior into the analysis of the wheel speed information in such a manner that variations in the information attributed to a vehicle's peculiarities can be virtually eliminated as a source of false alarms.

To effectively reduce the risk of false alarms in the system caused by external factors, the present invention generally develops predetermined models of the relationship between the individual wheel speed values for a variety of operating scenarios. The scenarios are those that would cause notable wheel speed variations not attributable to loss of tire pressure, such as the above-described external factors. The models thus developed are made available to the routine in accord with the present invention, and are compared to the sensed speed of the individual wheels. Generally, from this comparison, if it is determined that the vehicle is operating in such a manner that the present wheel speed data is not useful for the determination of tire pressure, the data is discarded, and the present iteration of the routine is terminated.

Otherwise, the wheel speed data is compared to predetermined models of what the data should resemble if there is at least a threshold loss of pressure in a vehicle tire. If this comparison indicates a sufficient loss of tire pressure, the routine provides an indication thereof to the vehicle operator, who can then take appropriate action.

DESCRIPTION OF THE DRAWINGS

FIGS. 4a through 4h are diagrams describing examples of wheel delta speed patterns for some vehicle maneuvers; and FIGS. 5a through 5h are diagrams describing wheel delta speed patterns for tire leaks.

DESCRIPTION OF THE PREFERRED EMBODIMENT

The inflation pressure of conventional automotive tires is related to the tire radius in that, to an extent, increasing the tire pressure increases the radius. Further, tire radius is related to tire rotation speed in that, for a given vehicle speed, the tire rotation speed will increase as the tire radius decreases. Accordingly, by relating the tire (wheel) speed of the vehicle tires to each other, all of which are subject to a common vehicle speed, information on the tire radius and thus on the individual tire inflation pressure is made available.

Vehicles are available that already have the necessary hardware for constant monitoring of wheel speed of each of the vehicle's wheels. Accordingly, to implement a system that determines tire pressure status purely on wheel speed information may be relatively inexpensive, as generally only an algorithm to interpret the already available wheel speed data, and perhaps a low pressure indicating means is needed.

Unfortunately, wheel speed information can indicate things other than deviations in tire pressure. For instance, wheel speed variations may be experienced when the vehicle is turning, is accelerating or decelerating, is going up or down steep grades, when at least one of the vehicle wheels is slipping, or when there is a cross wind bearing in the vehicle.

These "external factors", unless properly accounted for, can erode the accuracy of the pressure monitoring system, and can cause false indications of low tire pressure. Further, idiosyncrasies in the vehicle itself may bias the individual wheel speed values, increasing the potential for false indications of pressure loss. Such biases are typically difficult to account for, for instance by a predetermined model of vehicle behavior, as the biases are often vehicle specific, and can change in unpredictable ways throughout the life of the vehicle.

In response to the above-described external factors, the present invention compensates therefor by detecting when the factors are at work, and by dismissing the data skewed thereby as not being indicative of loss of tire pressure. Further, the present invention develops an adaptive model of the behavior of the wheel speed information in the absence of external factors, and in the absence of detected leaks in the tires. The model is continuously updated so as to make available an updated account of the vehicle bias not due to external factors or tire leaks. The present invention uses this information to further screen the wheel speed data.

Figure 1:
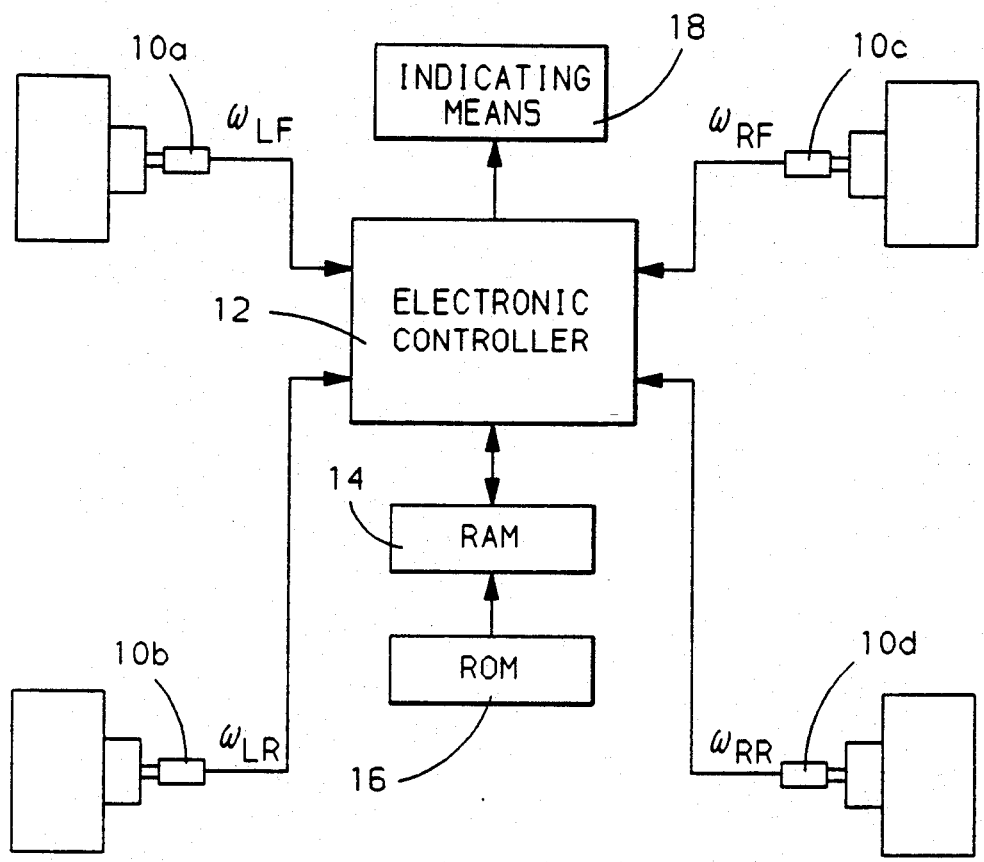
FIG. 1 is a general diagram of the hardware used to carry out this invention in accord with this embodiment.

The hardware necessary to sense and process the wheel speed at the four wheels is shown in FIG. 1. Conventional wheel speed sensors 10a, 10b, 10c, and 10d are located at the wheels of a conventional automotive vehicle, and provide the speed of the left front wheel $w_{LF}$, the right front wheel $w_{RF}$, the left rear wheel $w_{LR}$, and the right rear wheel $w_{RR}$ to a conventional electronic controller 12, such as a Motorola MC68HC11 single chip microcomputer. The wheel speed information is stored in conventional microcomputer random access memory 14. At pre-specified times during the operation of the controller, information is transferred from the conventional read only memory 16 to random access memory 14, so as to be more accessible to the controller 12.

The wheel speed information is used to determine first whether the vehicle is operating in a manner wherein it is assumed that reliable tire pressure information is available from the wheel speed data. If reliable information is available, the wheel speed data is used to determine whether there has been a recent pressure loss in one of the vehicle tires. The vehicle operator is notified via an indicating means 18 if such a loss is found.

Figure 2:
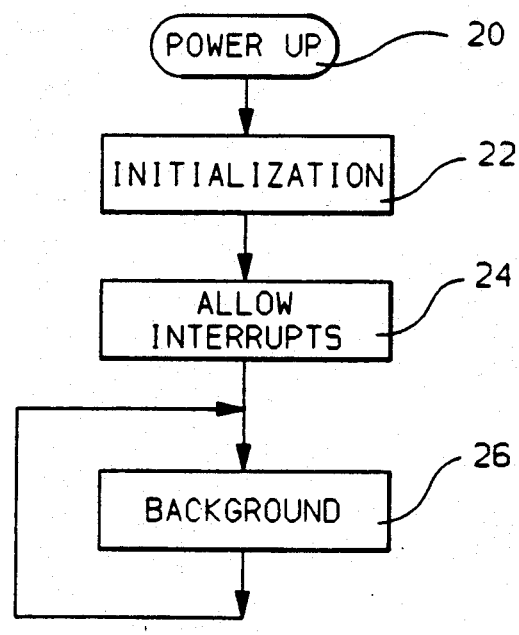
FIGS. 2, 3a, and 3b are computer flow diagrams used to carry out the steps in accord with this invention.
Figure 3A:
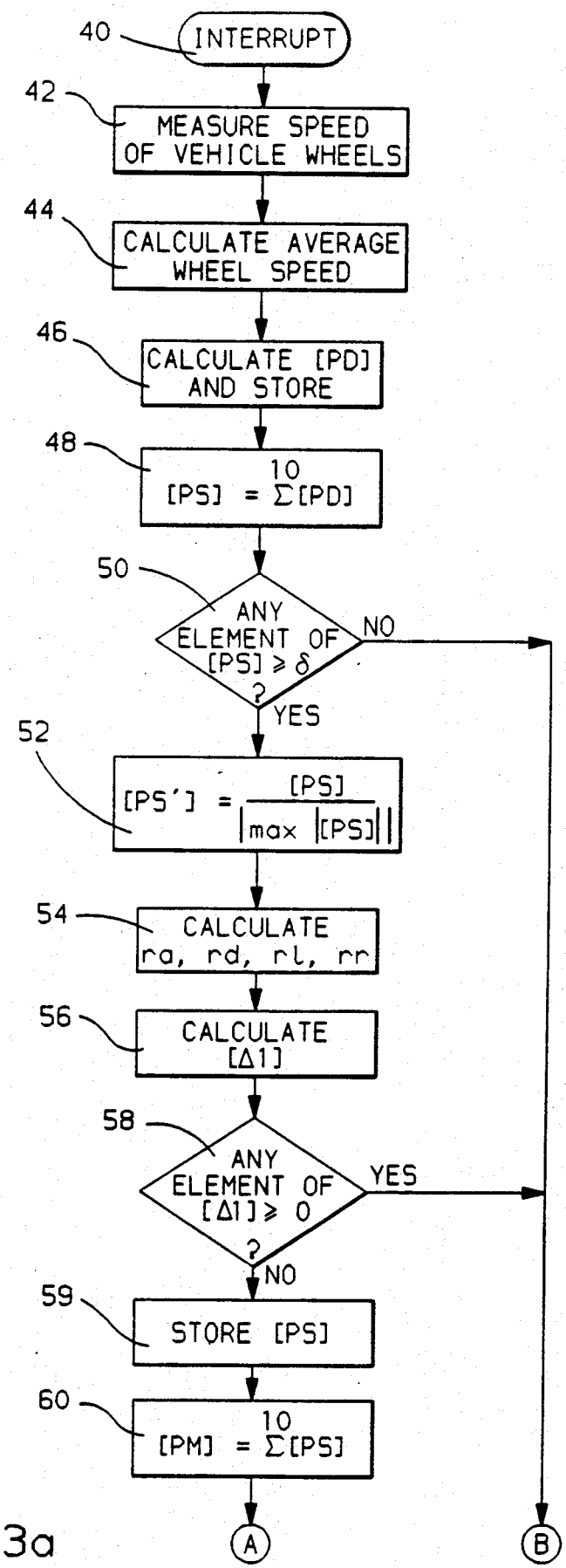
Figure 3B:
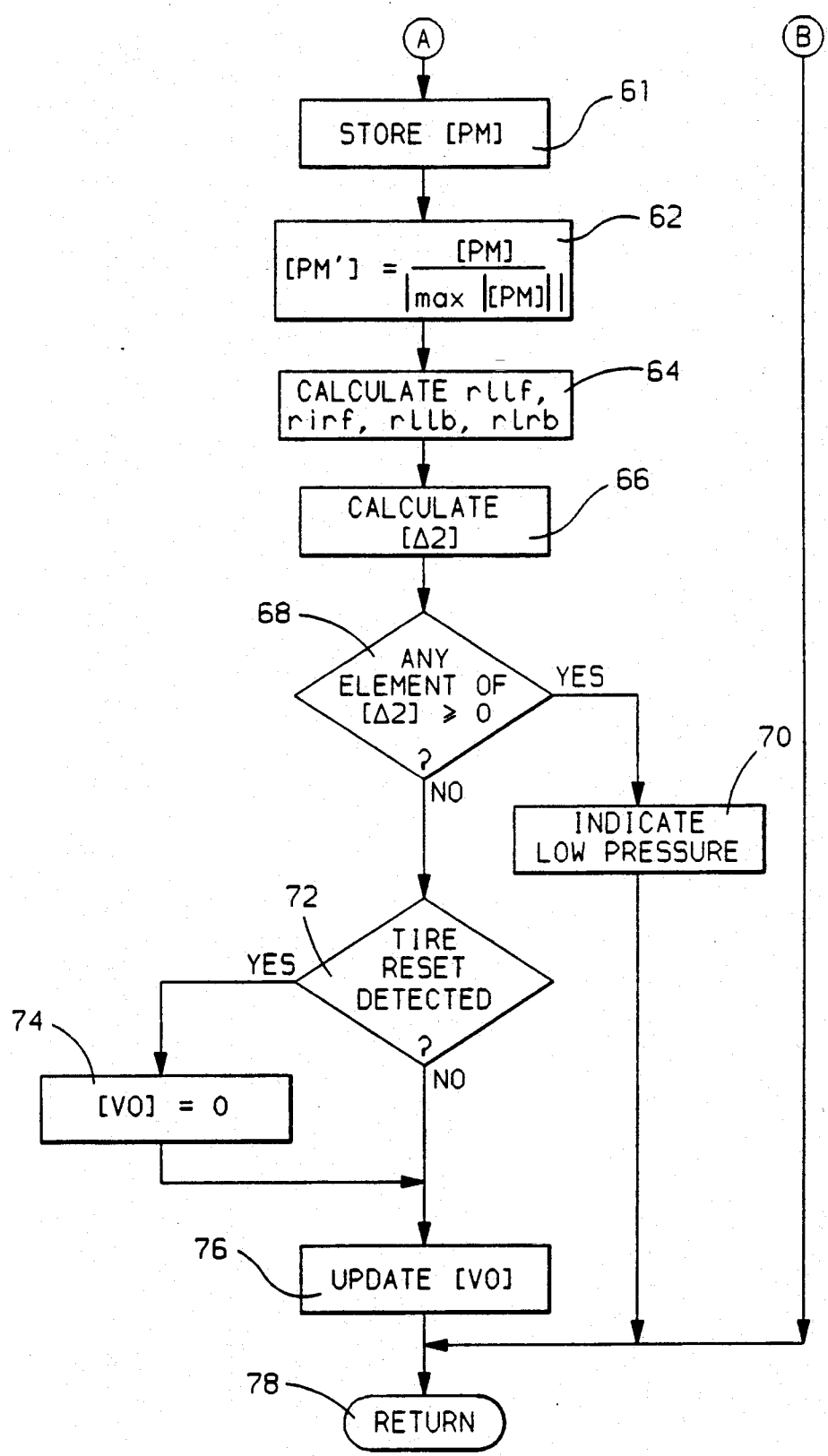

The routines used to process the wheel speed information so as to make the above-described determinations are illustrated in FIGS. 2, 3a, and 3b. When power is first applied to the system, such as when the vehicle ignition switch is rotated to its "on" position, the routine of FIG. 2 is initiated at point 20, and proceeds to step 22, to provide for general system initialization. For example, at this step initial values stored in the computer read only memory ROM 16 are entered into ROM designated random access memory 14 locations, and counters, flags and pointers are initialized.

After the initialization step, the routine proceeds to step 24 where interrupts are enabled, such as by resetting the interrupt mask bit in the condition code register. Next, the routine proceeds to a background loop at step 26, which is continuously repeated. This loop may include, for example, diagnostic and maintenance routines. In this embodiment, the background routine is interrupted every 100 milliseconds to execute the routine used to carry out the steps specifically embodying the principles of this invention.

This routine is illustrated in FIGS. 3a and 3b, and is entered, upon the occurrence of the 100 millisecond interrupt, at step 40. The routine proceeds to step 42 to measure the angular speed of the vehicle wheels, for example using the four sensors illustrated in FIG. 1. The routine then proceeds to step 44, to calculate the vehicle speed as an average of the four wheel speed values, as measured by the sensing configuration of FIG. 1, according to the following equation $$w_{avg} = (w_{LF} + w_{RF} + w_{LR} + w_{RR})/4.$$

The routine then proceeds to step 46 to calculate [PD], which is a matrix of adjusted delta speed patterns, according to the following equation $$[PD] = \begin{bmatrix} \Delta F \\ \Delta B \\ \Delta L \\ \Delta R \\ \Delta D \\ \Delta X \end{bmatrix} - (w_{avg} * [VO])$$

where $$\begin{bmatrix} \Delta F \\ \Delta B \\ \Delta L \\ \Delta R \\ \Delta D \\ \Delta X \end{bmatrix} = \begin{bmatrix} w_{LF} - w_{RF} \\ w_{LF} - w_{RR} \\ w_{LF} - w_{LR} \\ w_{RF} - w_{RR} \\ w_{LF} - w_{RR} \\ w_{RF} - w_{LR} \end{bmatrix}$$

and [VO] is a vehicle offset matrix, representing a long term measure of the vehicle wheel speed response in the absence of external factors and in the absence of detected tire leaks. The [VO] matrix will be described in more detail later in this description. The calculated matrix [PD] is stored in controller memory for use later in this routine.

The routine next proceeds to step 48, to determine [PS], which is a matrix representing the summation of calculated [PD] matrices over a predetermined period of time. In this embodiment, the [PD] matrix is calculated every 100 milliseconds, per the above-described iteration rate of the routine illustrated in FIGS. a and 3b. Further, in this embodiment, the PS matrix is the sum of the most recent ten [PD] matrices and, as such, represents a sampling of wheel speed activity over the last one second of operation.

After determining the [PS] matrix, the routine moves to step 50, to compare each of the constituent elements of the [PS] matrix to a predetermined deadband value δ. This comparison is a means by which it may be efficiently determined at an early point in the execution of the routine whether the entries in the [PS] matrix indicate that the vehicle is not experiencing any excursions from what is assumed to be maneuver-free and leak-free operation. In other words, the inventors have determined that early on in this detailed analysis of wheel speed information, a relatively simple check can be made on the delta wheel speed information, by which the routine may ascertain that no suspicious activity is going on which may give rise to a later detection of a loss of pressure in one of the vehicle tires.

Accordingly, if all of the elements of the [PS] matrix are less than the deadband value δ, the routine of FIGS.

3a and 3b returns, via step 78, to the background routine of FIG. 2, as the difference in wheel speeds is so small that it is assumed that there are no substantial losses of tire pressure. However, if, at step 50, any element of the [PS] matrix exceeds δ, the routine must proceed to determine whether the deviation is the result of a vehicle maneuver, or is the result of a loss of pressure in one of the vehicle tires.

To carry out this further analysis, the routine proceeds to step 52, to normalize the [PS] matrix. The normalization process is merely a means to condition the elements of [PS] so as to provide a basis of comparison to likewise normalized predetermined comparison values. The process used in this embodiment is one recognized as a standard means of mathematical normalization, specifically, dividing each of the elements of the [PS] matrix by the absolute value of the element thereof with the largest magnitude. The normalized matrix, designated [PS]', has six elements, $PS_1'$ through $PS_6'$, all of which necessarily have a magnitude less than or equal to one.

The inventors contemplate that the above-described normalization process is merely one means of providing a basis of comparison between the elements of the [PS] matrix and likewise normalized values, and that other means of providing a basis of comparison may be equally suited for the purposes of this routine, and could be substituted at step 52 without departing from the true spirit of this invention.

The routine next proceeds to step 54, to calculate four characterization values. These values are derived from the elements of the normalized wheel speed pattern matrix [PS'], and characterize the vehicle behavior as described by the most recent one second of wheel speed data. The information is characterized so as to indicate whether the vehicle is in an operating state which normally has such a deleterious effect on the content of the wheel speed data that it is unlikely that any useful information will be available from that wheel speed data on the pressure of the vehicle tires.

Once the characterization values are calculated, if it is determined that the vehicle is operating in such a state, the routine will simply discard the most recent wheel speed information as being substantially valueless for the purposes of this routine, and will return to the background routine of FIG. 2 straight-away. However, if the vehicle is operating in such a state that valuable information on tire pressure may be derived from the wheel speed data, the routine will proceed to a derivation process, as described in steps 59 through 76 of the routine of FIGS. 3a and 3b.

Specifically to carry out this process, the routine at step 54 calculates characterization values for vehicle maneuvers, such as an acceleration value ra, a deceleration value rd, a left turn value rl, and a right turn value rr, according to the following equations $$ra = 1/((PS'_1 - PA_1)^2 = (PS'_2 - PA_2)^2 = \ldots = (PS'_6 - PA_6)^2)$$

$$rd = 1/((PS'_1 - PD_1)^2 = (PS'_2 - PD_2)^2 = \ldots = (PS'_6 - PD_6)^2)$$

$$rl = 1/((PS'_1 - PL_1)^2 = (PS'_2 - PL_2)^2 = \ldots = (PS'_6 - PL_6)^2)$$

$$rr = 1/((PS'_1 - PR_1)^2 = (PS'_2 - PR_2)^2 = \ldots = (PS'_6 - PR_6)^2)$$

where the six elements of each of the [PA], [PD], [PL], and [PR] matrices are as shown in FIGS. 4b, 4d, 4f, and 4h, respectively. These matrices consist of predetermined, normalized values, taking on one of the three values −1, 0, or 1, which are meant to indicate the magnitude relationship between the speed of the respective wheels, as shown in the diagrams of FIGS. 4a, 4c, 4e, and 4g, while the vehicle is operating in one of a predetermined variety of operating conditions, such as acceleration, deceleration, or turning, with equal pressure in the tires.

For instance, a value of 0 indicates the speed of the two wheels normally will be substantially the same in the indicated operating condition. A value of −1 indicates that the second wheel has a greater speed than the first, and a value if 1 indicates that the first wheel has a greater speed than the second in the indicated operating condition. The ordering of the wheels for this purpose is as was described in the calculation of [PD] at step 46 of the routine of FIG. 3a. For example, referring to FIGS. 4a and 4b, [PA], the matrix representing normal wheel speed relationships during vehicle acceleration, shows that the two front wheels should be approximately the same speed, the two rear wheels should be approximately the same speed, and each of the front wheel speeds should be less than each of the rear wheel speeds.

Similarly, [PD], [PL], and [PR] characterize the wheel speed relationships during deceleration, left turn, and right turn, respectively. Furthermore, the inventors intend that other characterizations may be determined at this step beyond the four mentioned, that likewise may have a deleterious effect on the value of the wheel speed information, such as the presence of wind with a substantial cross-wind component, severe uphill or downhill travel, or operation with a tire slip condition. Matrices characterizing these additional external factors may be included herein without departing from the true spirit of this invention.

After determining the characterization values at step 54, the routine proceeds to step 56, to determine a [Δ1] matrix according to the following equation $$[\Delta 1] = \begin{bmatrix} ra \\ rd \\ rl \\ rr \end{bmatrix} - \begin{bmatrix} tra \\ trd \\ trl \\ trr \end{bmatrix}$$

where tra, trd, trl, and trr are the threshold recognition values for the maneuvers of acceleration, deceleration, left turn, and right turn, respectively.

These recognition threshold values represent the approximate minimum magnitude of the recognition values ra, rd, rl, and rr that correspond to a material maneuver, which is a maneuver determined to be so substantial that the wheel speed information available while that maneuver is taking place is, in the context of tire pressure detection, substantially valueless. As mentioned, the inventors intend that other recognition values, and recognition threshold values could be included here, which also have a negative effect on the value of the wheel speed information vis-a-vis tire pressure detection.

Accordingly, if any recognition value exceeds or is equal to its corresponding recognition threshold value, the wheel speed data as determined and conditioned at the preceding steps 42 through 54 is assumed to be so skewed that information on the present tire pressure either is not available from that data, or is too difficult to reproduce therefrom for the purposes of this routine. Accordingly, the data is discarded.

Specifically, the routine at step 56, determines the elements of the [Δ1] matrix by subtracting the recognition threshold values from their corresponding recognition values, as shown above. Next, at step 58, if any of the elements of the [Δ1] matrix are greater than or equal to zero, indicating that the wheel speed information may be skewed by a recent vehicle operating condition, the routine proceeds to step 78, to return to the background routine of FIG. 2 without saving the calculated PS matrix.

Alternatively, if all of the elements of the [Δ1] matrix are less than zero, the vehicle is assumed to be operating in a sufficiently stable operating condition that valuable tire pressure information may still be available from the wheel speed data. Accordingly, the routine proceeds to steps 59 through 76, to determine whether there is a substantial loss of pressure in any of the vehicle tires.

The routine thus proceeds to step 59, to store the elements of the [PS] matrix in controller random access memory 14 for future use. Next, the routine advances to step 60 to determine [PM], which is a matrix representing a sampling of delta wheel speed behavior over a predetermined period of time. For example, in this embodiment, the [PM] matrix is a summation of the ten most recent [PS] matrices and, as such represents a sampling of the delta wheel speed information over the most recent 10 seconds of operation.

The routine next moves to step 61, to store the elements of the [PM] matrix in controller random access memory 14 for later use. The routine proceeds next to step 62, to normalize the elements of the [PM] matrix, by dividing each [PM] element by the absolute value of the [PM] element with the largest magnitude, in the manner described above at step 52 of the routine of FIG. 3a. The matrix of six normalized values, $PM_1$, through $PM_6'$, is then stored as [PM']. The normalizing step 62 is merely a means of conditioning the elements of the [PM] matrix, to put them in a form more useful for the mathematical purposes of the routine of FIG. 3b. However, the inventors envision that any means of preparing the delta wheel speed information for such mathematical manipulation as will be described shortly would be sufficient at step 62.

Next, the routine advances to step 64, to calculate rllf, rlrf, rllb, and rlrb, which are indicative of the degree of pressure degradation in each of the four tires of the vehicle. In other words, these four values are in such form that they indicate the tire pressure of each of the four vehicle tires. They generally are based on the aggregate deviation of the delta wheel speeds from a predetermined set of wheel speeds indicative of leaks in each of the four tires of the vehicle. They specifically are determined from the following equations $rllf = 1/((PM_1' - PLLF_1)^2 = (PM_2' - PLLF_2)^2 = \ldots = (PM_6' - PLLF_6)^2)$ $rlrf = 1/((PM_1' - PLRF_1)^2 = (PM_2' - PLRF_2)^2 = \ldots = (PM_6' - PLRF_6)^2)$ $rllb = 1/((PM_1' - PLLB_1)^2 = (PM_2' - PLLB_2)^2 = \ldots = (PM_6' - PLLB_6)^2)$ $rlrb = 1/((PM_1' - PLRB_1)^2 = (PM_2' - PLRB_2)^2 = \ldots = (PM_6' - PLRB_6)^2)$ where [PLLF], [PLRF], [PLLB], and [PLRB] are matrices with six elements each, representing normalized characterizations of each of the six delta wheel speed relationships experienced while the vehicle is undergoing a leak in one of its tires. As shown in FIGS. 5b, 5d, 5f, and 5h, the elements of these matrices take on one of the three values −1, 0, or 1. These values are meant to indicate the magnitude relationship between the speed of the respective wheels, as shown in FIGS. 5a, 5c, 5e, and 5g, while each individual tire is operating in a low pressure condition.

For instance, a value of 0 indicates the speed of the two wheels is substantially the same. A value of −1 indicates that the second wheel has a greater speed than the first, and a value if 1 indicates that the first wheel has a greater speed than the second. The ordering of the wheels for this purpose is as was described in the calculation of [PD] at step 46 of the routine of FIG. 3a. For example, referring to FIGS. 5a and 5b, [PLLF], the matrix representing normal wheel speed relationships while the left front tire is low in pressure, shows that the left front wheel should be rotating at a higher speed than the other three tires, and that the other three should be rotating at approximately the same speed.

Similarly, the [PLRF], [PLLB], and [PLRB] matrices characterize the wheel speed relationships with low pressure in the right front, left rear, and right rear tires, respectively. The six values in each of these matrices are normalized to illustrate the trend in comparative wheel speeds under the aforementioned leaks, and are shown specifically in FIGS. 5b, 5d, 5f, and 5h.

Accordingly, the four calculated values are summations of delta speed deviations for all of the delta speed values, between the present vehicle operating condition and the operating condition as should be expected for a leak in the front left tire, the front right tire, the left rear tire and the right rear tire, as discussed. After calculating the four values, the routine moves to step 66, to calculate a [Δ2] matrix, according to the following equation $$[\Delta 2] = \begin{bmatrix} rllf \\ rlrf \\ rllb \\ rlrb \end{bmatrix} - \begin{bmatrix} trllf \\ trlrf \\ trllb \\ trlrb \end{bmatrix}$$

where trllf, trlrf, trllb, and trlrb are threshold recognition values for leaks in each of the vehicle tires, including a left front tire leak, right front tire leak, left rear tire leak, and right rear tire leak, respectively.

These recognition threshold values represent the approximate minimum magnitude of the recognition values rllf, rlrf, rllb, and rlrb that correspond to a minimum leak, which is a leak determined to be of a degree that it can be detected and should be addressed. Accordingly, if any recognition value exceeds or is equal to its corresponding recognition threshold value, a leak of at least minimum size is assumed, and the vehicle operator is notified thereof.

Specifically, the routine at step 66, calculates the elements of the [Δ2] matrix, by subtracting the recognition threshold values from their corresponding recognition values as shown above. Next, at step 68, if any of the elements of the [Δ2] matrix are greater than or equal to zero, indicating the presence of at least one leak, the routine proceeds to step 70, to indicate the leak condition to the operator of the vehicle via a conventional indicating means 18, such as by illuminating a descriptive warning light on the instrument panel of the vehicle, or by sounding an aural alert in the vehicle cabin.

Further, the inventors intend that the leak indicating means may include means for distinguishing critical information on the leak itself, and apprising the vehicle operator of that information. For example, included in this information could be the location of the leak, which may be determined from the specific element of the [Δ2] matrix that is greater than or equal to zero as determined at step 68, or further the magnitude of the leak, which may be determined from the degree of deviation from zero at step 68, or still further the time history of the magnitude of the leak. After apprising the driver of the detected leak, the routine proceeds to step 78, where it is directed to return to the background routine illustrated in FIG. 2.

Alternatively, if all of the elements of the [Δ2] matrix are less than zero, it is assumed that there are no material leaks in the vehicle tires, and the routine proceeds to step 72, to determine if a tire reset has occurred since the last execution of step 72. A tire reset occurs either manually or automatically when the tires or wheels of the vehicle are changed.

The inventors have determined that a tire change will so substantially affect the elements of the vehicle offset matrix [VO], that upon a tire or wheel change, prior vehicle offset information will be substantially obsolete. As such, upon a tire or wheel change, old information contributing to the calculation if the elements of the [VO] matrix will be discarded, and only information accrued since the change will by factored into the determination of the [VO] matrix. As stated, the reset may be made manually, such as by switch actuation by the vehicle operator or by the tire or wheel change technician, or may be made automatically, such as by a switch actuated when the vehicle tires or wheels are changed.

Accordingly, if at step 72, a reset has occurred, the routine proceeds to step 74, to clear the elements of the prior [VO] matrix in controller memory. Next, or if there has not been a reset, the routine proceeds to step 76, to update the vehicle offset matrix [VO], according to the following equation $$[VO] = \begin{bmatrix} \Sigma(\Delta F/w_{avg}) \\ \Sigma(\Delta B/w_{avg}) \\ \Sigma(\Delta L/w_{avg}) \\ \Sigma(\Delta R/w_{avg}) \\ \Sigma(\Delta D/w_{avg}) \\ \Sigma(\Delta X/w_{avg}) \end{bmatrix}$$

where ΔF, DB, ΔL, ΔR, ΔD, and ΔX are the six delta wheel speed values as calculated at step 46 of FIG. 3a, and $w_{avg}$ is the present vehicle speed, as calculated above at step 44 of FIG. 3a. [VO] is a matrix that aggregates delta wheel speed values while the vehicle is operating in such a state that the four wheels of the vehicle ideally should be operating at the same speed, such that the delta speed values should be substantially zero. Any non-zero delta speed values indicates some bias in the readings not attributed to external factors such as vehicle maneuvers, and not attributed to tire leaks.

Such values are aggregated and scaled by the present vehicle speed at step 76, the scaling being required due to the dependence of the magnitude of the delta wheel speed values on overall vehicle speed. The resultant values are subtracted from delta wheel speed data at step 46, before that data is used for the purposes of this invention. The six constituent elements of the [VO] matrix are scaled sums including all delta speed values determined and stored from the last tire reset, subject to three constraints.

First, as is obvious from the flow of FIGS. 3a and 3b, the summed and scaled values do not include delta wheel speed information taken when the vehicle is subject to some external factor or is in some maneuver, such as accelerations or turns. Second, as is also obvious from the flow of FIGS. 3a and 3b, the summed scaled values do not include delta wheel speed information when a leak has been detected at step 68. Third, the summed scaled values in this embodiment only include a predetermined amount of past stored delta wheel speed data, as it is assumed that data eventually becomes stale in that it is only indicative of the "steady-state" vehicle behavior for a predetermined period of time after being calculated. In this embodiment, only data for at most approximately the last 20 hours of operation is used in the calculation of the [VO] matrix.

Accordingly, subject to the above-described three constraints, the vehicle offset is determined at step 76, after which the routine returns to the background routine of FIG. 2, via step 78. The use of the [VO] matrix in the determination of both vehicle maneuvers and tire leaks provides a means of adapting the leak sensing means to virtually all unmodelled disturbances in the sensed delta wheel speed values, thereby providing a leak detecting means less prone to false alarms. Further, the overall flexibility of the control provides for expansion of the coverage to such sources of false alarms as cross-winds, and travel on steep slopes.

The foregoing description of a preferred embodiment for the purpose of explaining the principles of this invention is not to be considered as limiting or restricting the invention since many modifications may be made by the exercise of skill in the art without departing from the scope of the invention.

The embodiments of the invention in which an exclusive property or privilege is claimed are as follows:

1. A method for indicating a pressure loss condition in tires of a vehicle, each tire having a speed related to vehicle speed and to vehicle operating condition, comprising the steps of:

storing a predetermined number of tire speed patterns, each tire speed pattern representing relative tire speed conditions corresponding to a respective normal vehicle operating condition which results in tire speed variations;

sensing the speed of each of the tires;

determining an actual tire speed pattern from the sensed speeds of the tires representing an actual relative tire speed condition; and determining if the actual tire speed pattern corresponds to any one of the stored tire speed patterns, and (A) if not, determining whether there is a pressure loss condition in the tires in accord with the actual tire speed pattern, and (B) if so, bypassing the step of determining whether there is a pressure loss condition.

2. The method of claim 1, further comprising the step of storing a respective tire speed pressure loss pattern for each tire representing a relative tire speed condition when said tire is experiencing a pressure loss condition, and wherein the step of determining a pressure loss condition comprises the steps of comparing the actual tire speed pattern with the stored tire speed pressure loss patterns and indicating a pressure loss condition when the actual pattern corresponds to at least one of the stored tire speed pressure loss patterns.

3. A method for indicating a pressure loss condition in tires of a vehicle, each tire having a speed related to vehicle speed and to vehicle operating condition, comprising the steps of:

storing a predetermined number of tire speed patterns, each tire speed pattern representing relative tire speed conditions corresponding to a respective normal vehicle operating condition which results in tire speed variations;

sensing the speed of each of the tires over a predetermined time period;

determining an actual tire speed pattern from the sensed speeds of the tires representing an actual relative tire speed condition, and from a predetermined offset value; and determining if the actual tire speed pattern corresponds to any one of the stored tire speed patterns, and (A) if not, determining whether there is a pressure loss condition in the tires in accord with the actual tire speed pattern, and (B) if so, bypassing the step of determining whether there is a pressure loss condition.

4. The method of claim 3, further comprising the step of storing a respective tire speed pressure loss pattern for each tire representing a relative tire speed condition when said tire is experiencing a pressure loss condition, and wherein the step of determining a pressure loss condition comprises the steps of determining if the actual tire speed pattern corresponds to at least one of the stored tire speed pressure loss patterns and (A) if so, indicating a pressure loss condition, and (B) if not, adjusting the predetermined offset value by an amount related to the sensed tire speeds.

5. An apparatus for indicating a pressure loss condition in tires of a vehicle, each tire having a speed related to vehicle speed and to vehicle operating condition, comprising:

storing means for storing a predetermined number of tire speed patterns, each tire speed pattern representing relative tire speed conditions corresponding to a respective normal vehicle operating condition which results in tire speed variations;

speed sensing means for sensing the speed of each of the tires;

determining means for determining an actual tire speed pattern from the sensed speeds of the tires representing an actual relative tire speed condition;

means for comparing the actual tire speed pattern to the stored tire speed patterns; and pressure loss condition determining means for determining whether there is a pressure loss condition of the tires in accord with the actual tire speed pattern, the pressure loss condition determining means being operative when the actual tire speed pattern does not correspond to any one of the stored tire speed patterns.

6. The apparatus of claim 5, further comprising storing means for storing a respective tire speed pressure loss pattern for each tire representing a relative tire speed condition when said tire is experiencing a pressure loss condition, and wherein the pressure loss condition determining means further comprises means for comparing the actual tire speed pattern to the stored tire speed pressure loss patterns, and means for indicating a pressure loss condition if the actual tire speed pattern corresponds to at least one of the stored tire speed pressure loss patterns.

7. An apparatus for indicating a pressure loss condition in tires of a vehicle, each tire having a speed related to vehicle speed and to vehicle operating condition, comprising:

means for storing a predetermined number of tire speed patterns, each tire speed pattern representing relative tire speed conditions corresponding to a respective normal vehicle operating condition which results in tire speed variations;

means for sensing the speed of each of the tires over a predetermined time period;

means for determining an actual tire speed pattern from the sensed speeds of the tires representing an actual relative tire speed condition, and from a predetermined offset value; and means for determining if the actual tire speed pattern corresponds to any one of the stored tire speed patterns; and pressure loss condition determining means for determining whether there is a pressure loss condition in the tires in accord with the actual tire speed pattern, the pressure loss condition determining means being operative when the actual tire speed pattern does not correspond to any one of the stored tire speed patterns.

8. The apparatus of claim 7, further comprising storing means for storing a respective tire speed pressure loss pattern for each tire representing a relative tire speed condition when said tire is experiencing a pressure loss condition, and wherein the pressure loss condition determining means further comprises means for determining if the actual tire speed pattern corresponds to any one of the stored tire speed pressure loss patterns, and means for indicating a pressure loss condition if the actual tire speed pattern corresponds to any one of the stored tire speed pressure loss patterns, and means for adjusting the predetermined offset means by an amount related to the sensed speed of the tires if the actual tire speed pattern does not correspond to any one of the stored tire speed pressure loss patterns.

* * * * *